March 28, 1961  J. R. R. BERTRAND ET AL  2,976,662
MACHINE FOR WELDING THE WRAPPINGS OF CHEESES
Filed April 26, 1960  4 Sheets-Sheet 1
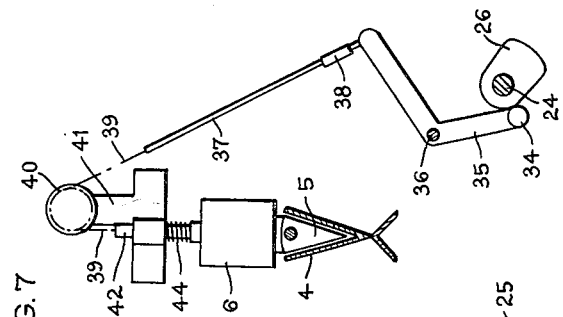
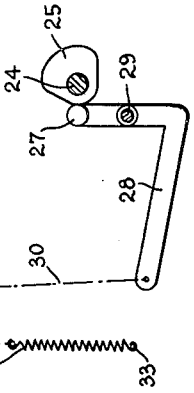
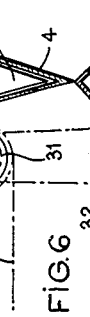
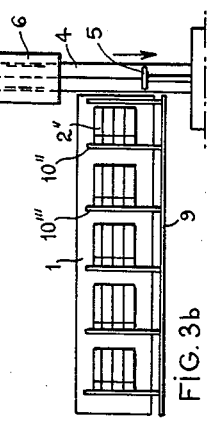
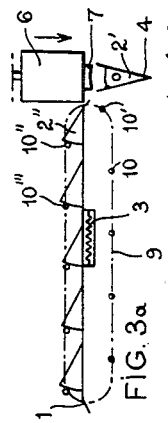
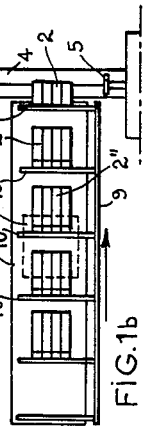
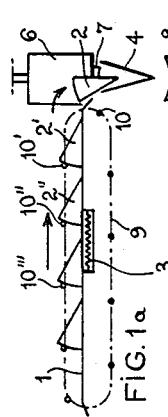

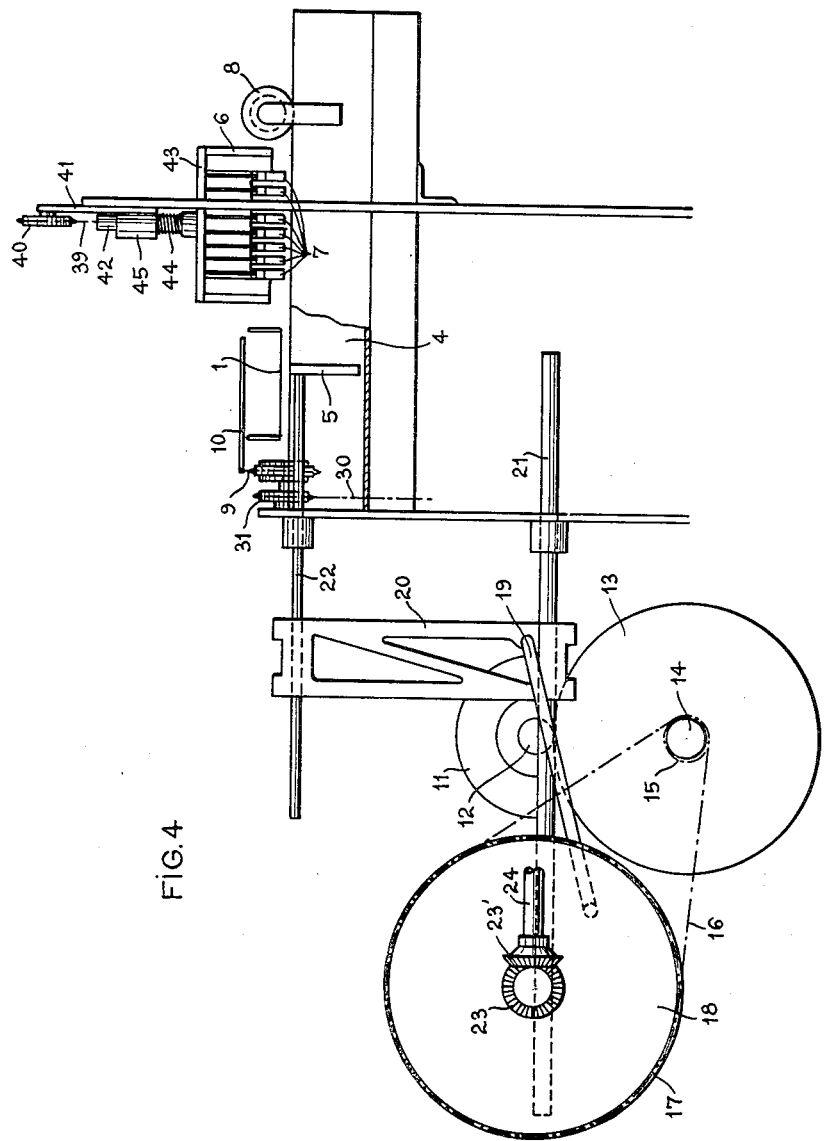

March 28, 1961   J. R. R. BERTRAND ET AL   2,976,662
MACHINE FOR WELDING THE WRAPPINGS OF CHEESES
Filed April 26, 1960
4 Sheets-Sheet 4
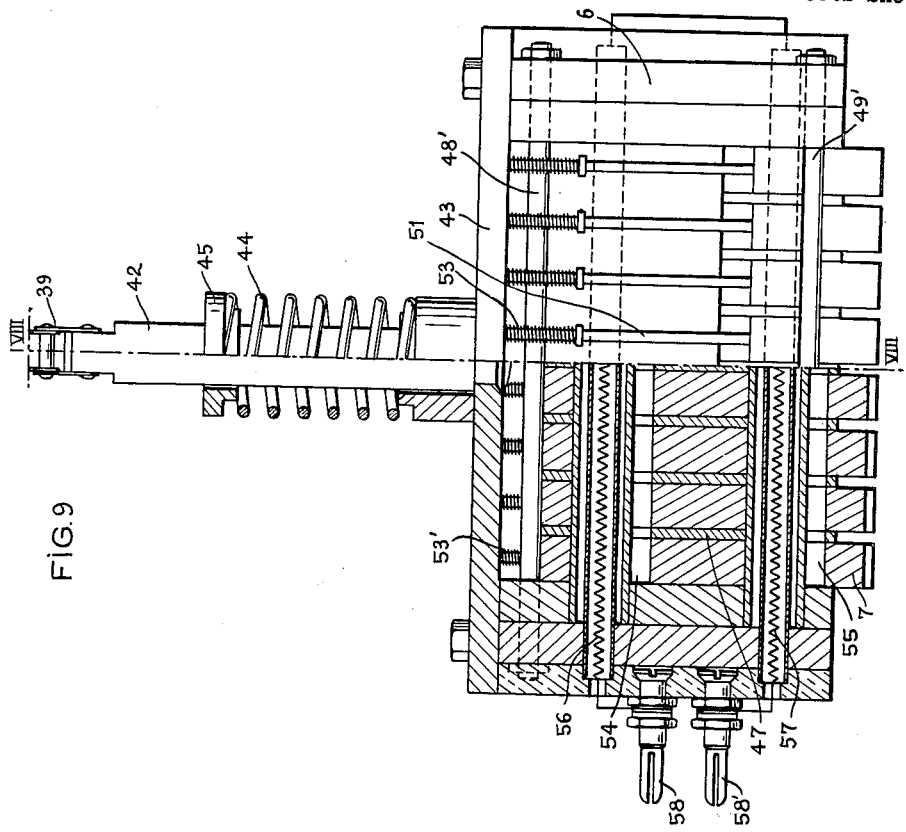
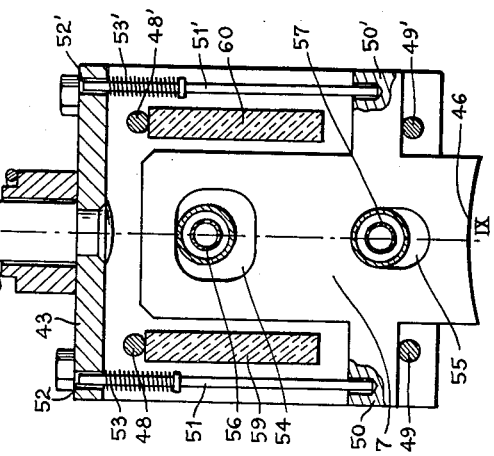

2,976,662
MACHINE FOR WELDING THE WRAPPINGS
OF CHEESES

Jacques Raymond Roger Bertrand, Roquefort-sur-Soulzon, Aveyron, France, assignor to Société Anonyme des Caves et des Producteurs Reunis de Roquefort, Roquefort-sur-Soulzon, France, a body corporate of France Filed Apr. 26, 1960, Ser. No. 24,799
Claims priority, application France Aug. 5, 1959
12 Claims. (Cl. 53—388)

The present invention relates to an automatic machine for welding the wrappings of certain commodities, more particularly portions of cheese in the shape of triangles or sectors, the said wrappings consisting of sheets, for example of aluminium, internally coated with a thermowelding material, more particularly with a wax or synthetic resin base.

According to the present invention there is provided a machine for welding the wrapping applied to bodies of triangular or sector shape, the wrappings including a coating of thermowelding material, the machine comprising a feed table for receiving the wrapped bodies, means for moving the bodies across the table and past a heating station adapted to heat the wrapping at one edge of each body, a chute for receiving the bodies from the table the chute being shaped to support each of the bodies by the heated side and a first adjacent side, a welding station located along the chute and comprising a reciprocable platen and heating means therefor, the platen being profiled to the shape of the second adjacent side and movable to engage that side, and driving means for presenting bodies received by the chute to the welding station and advancing the bodies beyond the welding station.

A form of embodiment of the machine according to the invention is described below and illustrated in the appended drawing, by way of example.

Figures 1a–1b, 2a–2b, 3a–3b diagrammatically illustrate, in elevation and plan view respectively, the essential members of the machine in three different phases of operation.

Figures 4 and 5 illustrate the driving devices of the machine, in elevation and plan view respectively.

Figures 6 and 7 are transverse sections along VI—VI and VII—VII respectively in Figure 5.

Figures 8 and 9 illustrate the device for welding the base of the portions, in longitudinal section and transverse section respectively.

Figure 5:
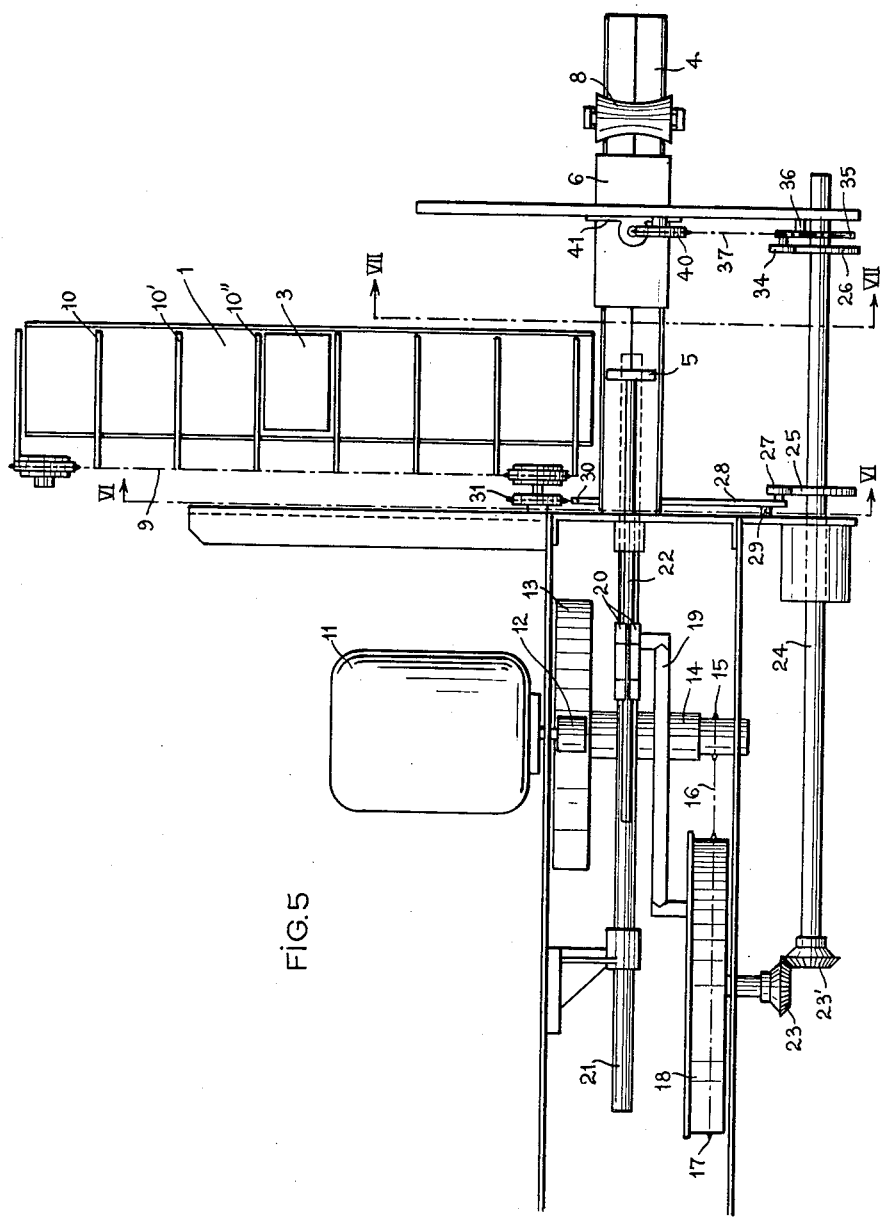

As indicated above, the machine according to the invention is intended to weld the wrappings of portions of cheese in the shape of isosceles triangles or sectors. The said wrappings consist of sheets, for example of aluminium, suitably cut out and internally coated with a thermowelding substance, the portion of cheese being so wrapped in the said sheets that the edges of the sheet overlap on one side and on the base, which may be rectilinear or in the form of an arc of a circle of the triangle or sector. In order to ensure that the said overlaps or folds are sealed, the wrapping must therefore be welded on one face and on the base.

As is diagrammatically illustrated in Figures 1 and 3, the machine comprises a moving feed table 1 upon which the portions are placed, on the face to be welded, in groups 2, 2', 2" . . . of a plurality of pieces which are simultaneously juxtaposed. The said table 1 moves forward discontinuously in the direction of the arrow, passes over a resistance heating device 3, and allows the groups of portions 2 to fall successively into a V-section chute 4 having an apex angle equal to that of the portions of cheese (Figure 1). At this instant, the table 1 stops, while a piston 5 moving longitudinally in the chute moves forward in its turn and pushes the portions 2 in the chute under a device for welding the bases of the wrapping, the said device consisting of a vertically movable block 6 containing transverse juxtaposed heater plates 7 equal in number to the portions in the groups 2, and having a lower edge with a profile adapted to that in the base of the portions. The said plates 7 are very slightly thinner than the portions of cheese, and are suspended independently of one another in order to be better adapted to the profile of the individual pieces, which may not be absolutely regular (each plate may, moreover, also be subdivided in the transverse direction for this purpose).

When a group 2 has been brought forward by the piston 5 under the welding device 6—7, the piston 5 withdraws (Figure 3), while the block 6—7 falls and assumes the position illustrated in Figure 1 in which the lower edges of the heater plates 7 come into contact with the bases of the portions in the group in the welding position. The pressure exerted by the plates 7, bringing the portions to bear against the walls of the chute 4, has the effect on the one hand of welding the lateral face which has already been heated upon passing over the resistance 3, and on the other hand of heating and welding the base of the portion. Once this welding has been carried out, the block 6—7 rises, the table 1 tips a new group of portions into the chute 4, and the piston 5 moves forward again in order to bring the said group forward under the block 6—7, at the same time driving the preceding block out of the welding station. When the chute is full up to the end with welded portions, the latter fall into a suitable unloading or removal device, which is not described because it does not form part of the invention. However, before leaving the chute 4, the portions 2 pass under a roller 8 which is freely journalled in the frame of the machine just above the chute, and has the effect of amply spreading and smoothing the welded fold by bringing the upper edge of the wrapping sheet to bear against the lower edge in such a manner as to impart a faultless appearance and a perfect seal to the welded fold.

The feed table 1 may be embodied in any known manner. In the form of embodiment adopted, it consists of a fixed supporting plate 1, along one side of which is displaced an endless chain 9, to which are attached, at regular intervals, transverse rods 10, 10', 10" . . . , between which are situated the groups of portions 2, 2', 2" . . . , which are pressed towards the chute 4 by a rod.

The discontinuous drive for the chain 9, which is synchronised with the drives for the piston 5 and the welding block 6—7, is illustrated in Figures 4 to 7. All the drives are from a single motor 11, which drives a flywheel 13 via a rubber-tyred friction roller 12, the shaft 14 of the said flywheel carrying a sprocket 15, which drives a wheel 17 fast with a second flywheel 18 via a chain 16. The flywheel 18 acts via a link 19 on a slider 20 moving on a guide rod 21, and having attached to it the rod 22 of the piston 5, thus imparting a reciprocating movement to the said piston.

Moreover, the shaft of the flywheel 18 acts via a pair of bevel wheels 23, 23' on a shaft 24 to which are keyed two cams 25 and 26. The cam 25 actuates a roller 27 fitted to the end of a bell-crank lever 28, which is pivoted at 29 and has a chain 30 attached to its other end. The chain 30 engages with a sprocket 31 fitted by way of a ratchet mechanism or a freewheel to one of the shafts of the chain 9 of the feed table 1, and is then attached to a return spring 32 which is itself hooked at a fixed point 33 to the frame of the machine. In this way, the cam 25 moves the table 1 or the chain 9 forward once per revolution, with a definite temporal displacement with respect to forward movement of the piston 5, and for the remainder of the revolution the spring 32 resets the lever 28, holding the roller 27 against the cam without displacing the table rearwards by virtue of the freewheel of the sprocket 31.

The cam 26 actuates a roller 34 fitted to a bell-crank lever 35, which is pivoted at 36 and has articulated to it a rod 37 equipped with a suitable length-adjusting device 38, and having attached to it a chain 39. This chain passes over a sprocket 40 freely journalled on a support 41 fast with the frame, and is attached at the other end to the welding block 6—7, which, when the cam 26 actuates the roller 34, lifts the said block 6—7, while when the low portion of the cam is in contact with the roller the block 6—7 falls towards the chute 4 by virtue of its own weight.

The chain 39 is preferably attached (Figures 4, 8 and 9) to a rod 42 attached to the plate 43 forming the base of the welding block 6, which takes the form of a box open at the bottom, a return spring 44 surrounding the said rod 42 bearing against the plate 43 and against a fixed abutment 45 fast with the frame, so that the block 6 is elastically suspended, and is forcibly returned to the working position, exerting the required pressure on the portions to be welded.

As may be seen in Figures 8, 9, the heater plates 7 comprising a profiled lower edge 46 are separated from one another in the supporting box 6 by fixed plates 47 attached to the support 6 by longitudinal rods 48, 48' and 49, 49'. The plates 7 have two lateral catches 50, 50', by means of which they rest on the rods 49, 49'. In addition, they are equipped with two rods 51, 51' screwed into the catches 50, 50', sliding in apertures 52, 52' in the plate 43 and equipped with return springs 53, 53': these plates are thus elastically suspended, and can easily adapt themselves to the shape of the portions 2 when brought to bear against the same. The plates 7 have apertures, for example two in number, 54, 55, having a height greater than the maximum compression stroke of the springs 53, 53', and tubular heater resistances 56, 57, connected to current-feed pins 58, 58', pass through the said apertures. A heat-insulating covering, for example in the form of an Everite plate 59, 60, is provided on the lateral walls of the supporting box 6 in order to direct the heat radiated by the plates 7 downwards on to the portion to be welded.

What is claimed is:

1. A machine for welding the wrapping applied to bodies of triangular or sector shapes, such as portions of cheese, said wrappings including a coating of thermo-welding material, the machine comprising a feed table for receiving the wrapped bodies placed on one edge thereof, means for moving said bodies across said table, a heating station arranged on the path of said bodies to heat the wrapping on the edge resting on the table, a V-shaped chute for receiving the bodies from the table, a welding station located along the chute and comprising a vertically reciprocable platen and heating means therefor, the lower edge of said platen being profiled to the shape of the base of the triangular or sector shaped bodies, driving means comprising a reciprocable piston movable inside the chute for presenting bodies received by the chute to the welding station and advancing the bodies beyond said station.

2. A machine for welding the wrapping applied to bodies of triangular or sector shapes, such as portions of cheese, said wrappings including a coating of thermo-welding material, the machine comprising a feed table for receiving the wrapped bodies placed on one edge thereof, means for moving said bodies across said table, a heating station arranged on the path of said bodies to heat the wrapping on the edge resting on the table, a V-shaped chute for receiving the bodies from the table, a welding station located along the chute and comprising a vertically reciprocable platen and heating means therefor, the lower edge of said platen being profiled to the shape of the base of the triangular or sector shaped bodies, driving means comprising a reciprocable piston movable inside the chute for presenting bodies, received by the chute to the welding station and advancing the bodies beyond said station, means for synchronising the movement of the wrapped bodies across the feed table with the reciprocating movement of the piston and of the welding platens to provide an intermittent drive thereof.

3. A machine for welding the wrapping applied to bodies of triangular or sector shapes, such as portions of cheese, said wrappings including a coating of thermowelding material, the machine comprising a feed table for receiving the wrapped bodies placed on one edge thereof, means for moving said bodies across said table, a heating station arranged on the path of said bodies to heat the wrapping on the edge resting on the table, a V-shaped chute for receiving the bodies from the table, a welding station located along the chute and comprising a vertically reciprocable platen and heating means therefor, the lower edge of said platen being profiled to the shape of the base of the triangular or sector shaped bodies, driving means comprising a reciprocable piston movable inside the chute for presenting bodies received by the chute to the welding station and advancing the bodies beyond said station, a motor, a first shaft driven by said motor, crank-arms for connecting said shaft with the piston moving in the V-shaped chute, a second shaft driven by said motor and parallel to the axis of said chute, two cam members carried by said second shaft and means to impart an intermittent motion from one of said cams to the bodies across the feed table and a reciprocating motion from the other cam to the welding platen.

4. A machine according to claim 3 wherein the means to provide an intermittent movement of the bodies across the feed table comprises a pivotably arranged bell-crank, a cam follower carried by one arm of said bell-crank and cooperating with the first cam carried by the shaft parallel to the axis of the chute, a ratchet pinion, a chain passing about said pinion and having its one end attached to the second arm of the bell-crank and its second end resiliently anchored to a fixed point, a shaft carrying said pinion and moving means driven by said shaft.

5. A machine according to claim 3 wherein the means to provide an intermittent movement of the bodies across the feed table comprises a pivotably arranged bell-crank, a cam follower carried by one arm of said bell-crank and cooperating with the first cam carried by the shaft parallel to the axis of the chute, a ratchet pinion, a chain passing about said pinion and having its one end attached to the second arm of the bell-crank and its second end resiliently anchored to a fixed point, a shaft carrying said pinion, an endless chain arranged at one side of the feed table, means to drive said chain from the shaft carrying said ratchet pinion, uniformly spaced, horizontal rods carried by said endless chain and arranged to push the wrapped bodies across the feed table.

6. A machine according to claim 3 wherein the means to impart a reciprocating movement to the welding platen comprises a pivotably arranged bell-crank, a cam follower carried by an arm of said bell-crank and cooperating with the second cam carried by the shaft parallel to the axis of the chute, a freely rotatable pinion, a chain passing about said pinion and having its one end connected to the second arm of the bell-crank and the platen being suspended upon the second end of said chain to be moved upwardly, spring bias means opposed to the upward pull exerted by the chain on said platen.

7. A machine for welding the wrapping applied to bodies of triangular or sector shapes, such as portions of cheese, said wrappings including a coating of thermo-welding material, the machine comprising a feed table for receiving the wrapped bodies placed on one edge thereof, means for moving said bodies across said table, a heating station arranged on the path of said bodies to heat the wrapping on the edge resting on the table, a V-shaped chute for receiving the bodies from the table, a welding station located along the chute and comprising a vertically reciprocable platen and heating means therefor, the lower edge of said platen being profiled to the shape of the base of the triangular or sector shaped bodies, driving means comprising a reciprocable piston movable inside the chute for presenting bodies received by the chute to the welding station and advancing the bodies beyond said station, a freely rotatable roller having a horizontal axis arranged above the V-shaped chute beyond the welding platen, said roller being profiled to the profile of the base of the triangular or sector shaped bodies and adapted to smooth the welded wrapping on said base.

8. A machine according to claim 7, wherein the welding platen comprises a carrier attached to the driving chain, a plurality of juxtaposed heating plates independently and elastically suspended upon said carrier and arranged parallel to the axis of the chute, said plates having each a thickness slightly less than the thickness of the wrapped bodies and having a lower edge profiled to be adapted to bear against a part of the base of the wrapped body.

9. A machine according to claim 7, wherein the welding platen comprises a carrier attached to the driving chain and having the shape of a rectangular box with an open bottom, a plurality of juxtaposed plates arranged in said box parallel to the axis of the chute to project downwardly from said box, and having each a thickness slightly less than the thickness of the wrapped bodies, two transversal supporting rods fixed either side of said plates to the lateral walls of the box near its bottom, each of said plates having two lateral catches resting on said rods, two upwardly extending vertical rods fixed to said catches, apertures provided in the top wall of the box shaped carrier wherein said vertical rods are freely slidable, and return springs biasing the plates against the horizontal supporting rods.

10. A machine according to claim 7, wherein the welding platen comprises a carrier attached to the driving chain and having the shape of a rectangular box with an open bottom, a plurality of juxtaposed plates arranged in said box parallel to the axis of the chute to project downwardly from said box, and having each a thickness slightly less than the thickness of the wrapped bodies, two transversal supporting rods fixed on either side of said plates to the lateral walls of the box near its bottom, each of said plates having two lateral catches resting on said rods, two upwardly extending vertical rods fixed to said catches, apertures provided in the top wall of the box shaped carrier wherein said vertical rods are freely slidable, and return springs biasing the plates against the horizontal supporting rods, a plurality of apertures provided in each plate and having a vertical dimension greater than the length of the displacement of said plates with respect to the box shaped carrier, each aperture in each plate being in register with the corresponding aperture of the adjacent plates, heating elements supported by the lateral walls of the box shaped carrier and extending through each set of registering apertures.

11. A machine according to claim 7, wherein the welding platen comprises a carrier attached to the driving chain, a plurality of juxtaposed heating plates independently and elastically suspended upon said carrier and arranged parallel to the axis of the chute, said plates having each a thickness slightly less than the thickness of the wrapped bodies and having a lower edge profiled to be adapted to bear against a part of the base of the wrapped body and thin spacing plates fast with the carrier provided between the adjacent heating plates.

12. A machine according to claim 7, wherein the welding platen comprises a carrier attached to the driving chain and having the shape of a rectangular box with an open bottom, a plurality of juxtaposed plates arranged in said box parallel to the axis of the chute to project downwardly from said box, and having each a thickness slightly less than the thickness of the wrapped bodies, two transversal supporting rods fixed on either side of said plates to the lateral walls of the box near its bottom, each of said plates having two lateral catches resting on said rods, two upwardly extending vertical rods fixed to said catches, apertures provided in the top wall of the box shaped carrier wherein said vertical rods are freely slidable, and return springs biasing the plates against the horizontal supporting rods, a plurality of apertures provided in each plate and having a vertical dimension greater than the length of the displacement of said plates with respect to the box shaped carrier, each aperture in each plate being in register with the corresponding aperture of the adjacent plates, heating elements supported by the lateral walls of the box shaped carrier and extending through each set of registering apertures and heat insulating coating arranged inside the carrier either side of the heating plates.

No references cited.